(12) United States Patent
Tuttle (10) Patent No.: US 7,412,417 B1
(45) Date of Patent: Aug. 12, 2008

(54) LOAN COMPLIANCE AUDITING SYSTEM AND METHOD

(75) Inventor: Frank D. Tuttle, Irvine, CA (US)

(73) Assignee: Infoglide Software Corporation, Austin, TX (US)

( * ) Notice: Subject to any disclaimer, the term of this patent is extended or adjusted under 35 U.S.C. 154(b) by 655 days.

(21) Appl. No.: 09/518,837

(22) Filed: Mar. 3, 2000

(51) Int. Cl.
*G06Q 40/00* (2006.01)
(52) U.S. Cl. ............................................. 705/38; 705/30
(58) Field of Classification Search ............. 705/10–44; 707/100–104
See application file for complete search history.

(56) References Cited

U.S. PATENT DOCUMENTS

| | | | | |
|---|---|---|---|---|
| 4,876,648 | A | * | 10/1989 | Lloyd ............................. 705/38 |
| 5,272,623 | A | * | 12/1993 | Grubb et al. ................. 717/100 |
| 5,655,085 | A |   | 8/1997 | Ryan et al. |
| 5,680,329 | A |   | 10/1997 | Lloyd et al. |
| 5,689,650 | A | * | 11/1997 | McClelland et al. .......... 705/36 |
| 5,699,527 | A | * | 12/1997 | Davidson ..................... 705/38 |
| 5,742,905 | A | * | 4/1998 | Pepe et al. .................. 455/461 |
| 5,765,144 | A |   | 6/1998 | Larche et al. |
| 5,825,283 | A | * | 10/1998 | Camhi ....................... 340/438 |
| 5,845,065 | A |   | 12/1998 | Conte et al. |
| 5,870,721 | A |   | 2/1999 | Norris |
| 5,963,925 | A |   | 10/1999 | Kolling et al. |
| 5,966,699 | A |   | 10/1999 | Zandi |
| 5,995,947 | A |   | 11/1999 | Fraser et al. |
| 6,643,625 | B1 | * | 11/2003 | Acosta et al. ................. 705/38 |

OTHER PUBLICATIONS

Phil Britt, "A look at Compliance Software", America's Community Banker, Sep. 7, 9, 16, 1998, Dialog file 148, Accession No. 11583469.+*

* cited by examiner

*Primary Examiner*—Frantzy Poinvil
(74) *Attorney, Agent, or Firm*—Taylor Russell & Russell, PC (57) ABSTRACT

The present invention comprises a system and method for auditing loan compliance with state and federal laws and regulations. The invention comprises allowing a user to display and enter loan audit compliance data and to interactively build a set of loan compliance rules. The loan compliance rules are built for all loan licenses available within a locality. The applicable licenses are then associated with a loan originator to form a list of applicable licenses for the loan originator. In response to a loan audit request, the system identifies the loan type and the loan originator, retrieves the applicable license for the loan type and the loan originator and then retrieves the loan compliance rules associated with the applicable licenses. The system compares the loan compliance rules to the loan data to determine loan audit compliance.

46 Claims, 10 Drawing Sheets

LOAN COMPLIANCE AUDITING SYSTEM AND METHOD

The present invention relates generally to systems for lending transactions involving loan origination for real estate. More particularly, the invention is a system, software program and method of use for businesses that originate and close loans secured by real estate to audit loan compliance with state and federal laws and regulations. The system and method may be accessed and delivered to the user over a global communications network such as the Internet.

BACKGROUND

Lending money, that is, granting credit and borrowing money dates back many hundreds if not thousands of years. Throughout the history of lending, there have been many lessons learned that have been passed on in the way of laws that serve to protect the parties involved in credit transactions. Many laws are in effect to protect the borrower and to establish transactional standards and requirements. The Federal government, as well as the individual States, has enacted laws and regulations that impose requirements on companies in the business of originating and closing loans. The Federal government and many States also have government agencies to enforce the compliance of these laws. These laws provide guidance and requirements for businesses acting as lenders within the various jurisdictions involved.

Inclusive in these laws are clearly defined requirements for a consistent, complete and timely disclosure of transactional details. The requirements include but are not limited to costs and fees, the parties involved and their relationships, the cost of credit using standardized calculations, limits and restrictions on repayment details, limits and restriction on penalties along with many requirements.

The lending requirements are varied and complex. So complex that the only method that has been used to verify a business's compliance with the requirements is a tedious manual operation involving a person looking through all of the data in a loan file and trying to find and identify any violations. Because of the large amount of time it takes to review a loan for compliance, not all loans are reviewed. Usually loan review is performed only on a statistical sampling of the loans. Not only is this process subject to the hit or miss proposition of sampling, it is also subject to varying degrees of individual understanding biases in interpretation. Because the requirements are complex and interrelated, errors in the audit process can occur. In summary, the current process is inefficient, time consuming, subject to errors, non-standardized and also subject to the problems of small sampling.

SUMMARY

The present invention provides a system, software program and method of use that performs an auditing function, which evaluates the compliance of real estate loans with state and federal laws and regulations. The software audits compliance with laws or regulations, which require a business to obtain certain licenses, before doing business in a jurisdiction. The software also audits compliance with rules and requirements, such as lending requirements, which are imposed upon those businesses holding each type of license. The software will also audit compliance with state-specific exceptions to federal regulations, and to the interpretation of federal regulations.

The software program utilizes an interface and data scheme, for entering and storing all types of state licenses, along with the state-specific compliance and lending rules that correspond to each type of license. Upon user request for compliance verification, the software identifies the loan type and the license(s) that is necessary for the originator or lender to extend the loan. The software identifies whether the business possesses a current and valid issue of the required license (s). The software then uses data elements in the loan file, which may be input by the user, to evaluate whether the loan complies with the state and federal requirements and exceptions, which govern the applicable jurisdiction. The software then responds to the user, indicating the loan's compliance, or failure to comply, with the rules and requirements that govern the loan.

The invention also provides a method of delivering the loan compliance software results. The method involves hosting the software program on a web server, from which users can employ the software to perform their loan compliance auditing. The software may be licensed to users for a certain term, or on a per-use basis.

The system and computer-implemented method of use of the present invention automates the determination of Federal and State compliance through the application of rules, tests and calculations on a set of data that represents an application for credit, that is a loan application. The loan audit can be performed before a loan is closed to insure that the lender and/or the originator have complied with all the Federal and State lending laws. Non-compliance with those lending laws can be potentially significant violations that result in fines, penalties, reimbursements and even the loss of the license to lend or originate loans.

The system and computer-implemented method can also be audited after the loan is closed. The loans can be audited by or on behalf of the borrower, an investor prior to sale or transfer, a polling or rating agency that verifies quality for securities, the Federal and State loan auditing agencies and the lender as part of a statistical quality control program.

The loan data to be audited can be manually entered into the system via a user interface, provided to the system in a structured software file format on magnetic media such as CD-ROM, diskette or the like, and loaded into the loan audit system, or uploaded to the loan audit engine via various communications means including the internet.

The present invention comprises a computer-implemented method for auditing loan compliance with government loan lending and licensing requirements comprising allowing a user to display and enter loan audit compliance data, allowing a user to interactively build loan compliance rules and in response to a loan audit request retrieving the loan compliance rules and comparing the loan compliance rules to loan data to determine loan audit compliance.

The present invention also comprises a computer-implemented method for auditing loan compliance with government loan lending and licensing requirements, comprising allowing a user to display and enter loan audit compliance data, allowing a user to interactively build loan compliance rules comprising and in response to a loan audit request identifying a loan type and the loan originator, retrieving the loan originator licenses for the loan type and the loan originator, retrieving the loan compliance rules associated with the loan originator licenses and comparing the loan compliance rules to loan data to determine loan audit compliance. Allowing the user to interactively build loan compliance rules comprises using applicable licenses for a geographic boundary, building loan compliance rules for all applicable licenses available within the geographic boundary and storing the loan compliance rules and associating licenses from the applicable licenses with a loan originator to form a set of loan originator applicable licenses and storing the list of loan originator licenses. The geographic boundary may be a state boundary.

The method further comprises building rules for all applicable licenses available within the geographic boundary using compliance base rule variables and rule building instructions and storing the loan compliance rules in a rule library.

Building rules for all licenses available within the geographic boundary comprises using the compliance base rule variables and rule building instructions and allowing the user to add a new license to the applicable licenses available and allowing a user to build new rules for the new license.

The method further comprises, if a rule exists in the rule library for a license, allowing the user to review the rule and change the rule. The compliance base rule variables represent data elements in a loan file. The rule building instructions comprise allowing the user to build rules by specifying equations using base rule variables. The rule building instructions allow for the controlling of the rule building process to eliminate rule errors.

The method further comprises associating the loan compliance rules with a license to form a set of assigned compliance rules. In the method, the user displays and enters loan data using a user interface embodied in a computer processor that communicates with the rule library via a communications network.

The communications network is a global communications network. The user is allowed to identify and store applicable exemptions to the government license requirements in the assigned compliance rules. The communications network may be selected from the group consisting of a satellite communication network, a telephone communication network, a microwave transmission network, a radio communication network and a wireless telephone communication network.

The government loan lender requirements may be state or federal loan requirements. The licensing requirements may be state or federal licensing requirements.

The present invention comprises a computer implemented method for auditing loan compliance with government and loan lending requirements, comprising electronically transferring loan data from a user interface embodied in a computer processor to a loan audit server computer over a communications network. At the user interface computer, the method allows a user to interactively build loan compliance rules using compliance based rule variables and rule building instructions. Interactively building loan compliance rules comprises using licenses applicable to the state, building rules for all applicable licenses available within the state and associating the applicable licenses with a loan originator to form a list of loan originator applicable licenses and storing the loan originator applicable licenses. The method further comprises storing the loan compliance rules in a database connected to the loan audit server computer. In response to a loan audit request, the method allows for the identifying of a loan type and the loan originator, retrieving the applicable licenses for the loan type and the loan originator by the loan server, retrieving the loan compliance rules associated with the applicable licenses from the stored rules in the database by the loan server, comparing the loan compliance rules to loan data to determine loan audit compliance results by the loan server, and electronically transferring the loan audit compliance results from the loan server to the user over a communications network.

The invention comprises a software program embodied on a computer-readable medium incorporating the method as recited above.

The invention is a system for auditing loan compliance with government and loan lending requirements, comprising a user interface for displaying and entering loan audit compliance data and a loan audit server communicating with the user interface. The loan audit server allows a user to interactively build a set of loan compliance rules using compliance base rule variables and rule building instructions. The system further comprises storing the loan compliance rules and in response to a loan audit request: identifying a loan type, determining the loan compliance rules that apply to the loan type and comparing the loan compliance rules to loan data associated with the loan audit request to determine loan audit results. The loan audit results may be stored in an audit compliance report. The loan audit results may be stored on media selected from the group consisting of a hardcopy report, a tape, a film and a CD-ROM.

Interactively building a set of loan compliance rules comprises using applicable licenses for the state, the user builds rules for all licenses available within the state using the compliance base rule variable and rule building instructions and stores the rules in a rule library and using the applicable licenses, allowing the user to associate the applicable licenses with a loan originator to form the loan originator applicable licenses.

In comparing the loan compliance rules with the loan data, the loan audit server identifies a loan type and loan originator, retrieves the applicable licenses for the loan type and the loan originator, retrieves the loan compliance rules associated with the applicable licenses from the stored rules in the rule library, compares the loan compliance rules to the loan data and compiles the loan audit results.

The loan compliance rules comprise compliance based rule variables, rule building, a compliance rules data library, assigned compliance rules, a list of government licenses for loan originators and data application rules.

The loan audit results are displayed to the user via the user interface. The user interface is embodied in a computer processor that communicates with the loan audit server via a communications network. The loan audit server comprises a global communications network ("web") data server capable of transmitting and receiving loan data to and from the user via a global communications network. The user interface may communicate with a web browser for transmitting and receiving the loan data and the loan audit results. The communications network for the system may be the Internet, a satellite communication network, a telephone communication network, a microwave transmission network, a radio communication network, and a wireless telephone communication network.

BRIEF DESCRIPTION OF THE DRAWINGS

These and other features, aspects and advantages of the present invention will become better understood with regard to the following description, appended claims and accompanying drawings where:

FIGS. 6 and 7 are exemplary displays of the user interface screens for managing the compliance rules libraries.

DETAILED DESCRIPTION OF THE DRAWINGS

Figure 1:
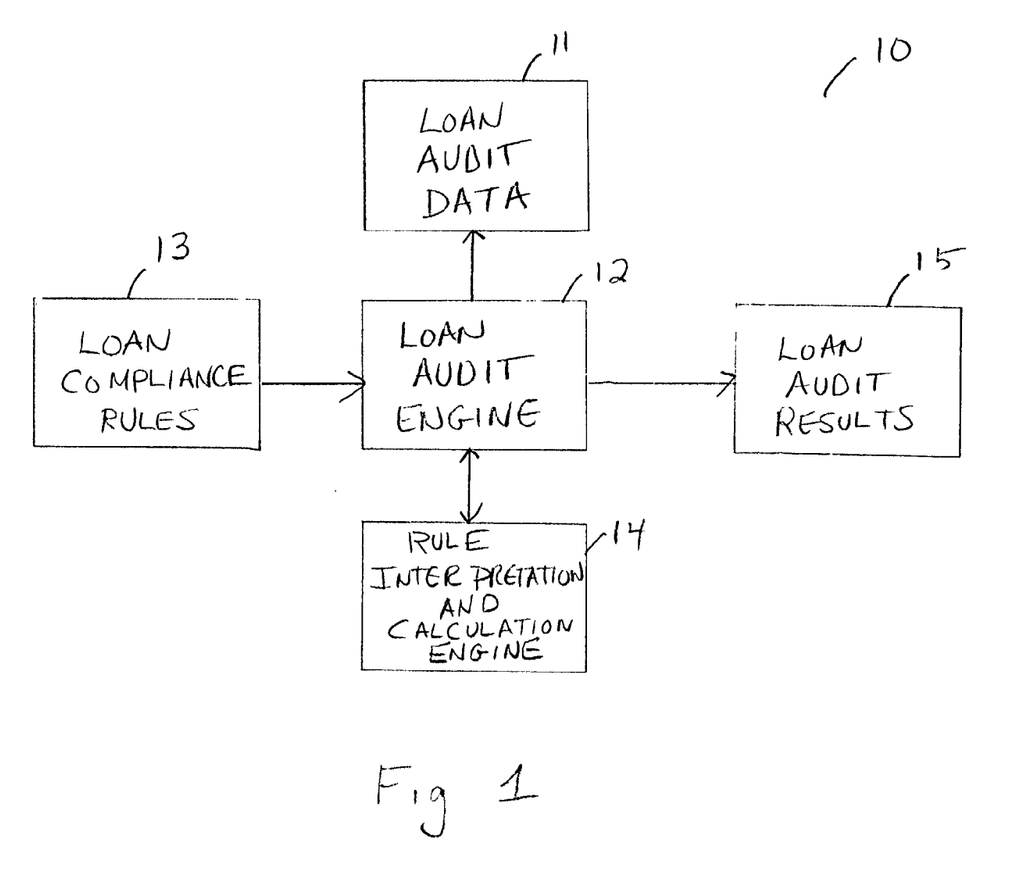
FIG. 1 is a system architecture diagram of the loan compliance auditing system.

FIG. 1 is a system architecture diagram of the loan compliance auditing system. In order to initiate a loan audit, the loan data 11, either from the loan application or from a closed loan, is presented to the audit engine 12. The audit engine accesses the loan compliance rules 13 for the loan. A calculation engine and rule interpreter 14 interprets the loan compliance rules 13 and then performs the checks and calculations against the loan application data 11. The output of this process is the loan audit result 15, which analyzes the loan data 11 (loan application or closed loan), based on the loan compliance rules 13.

Figure 2:
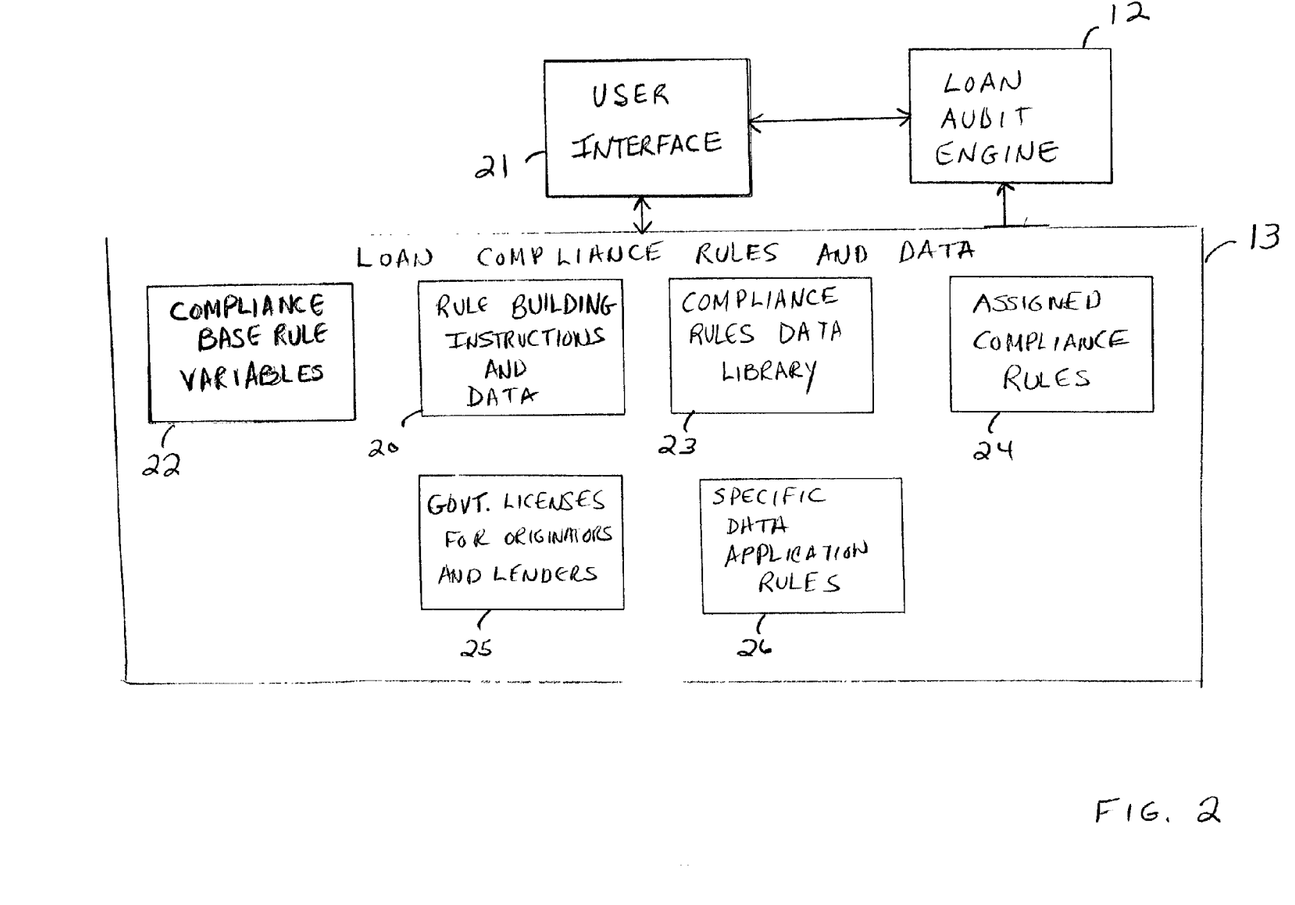
FIG. 2 is a system architecture diagram of the loan compliance rules and data.
Figure 6:
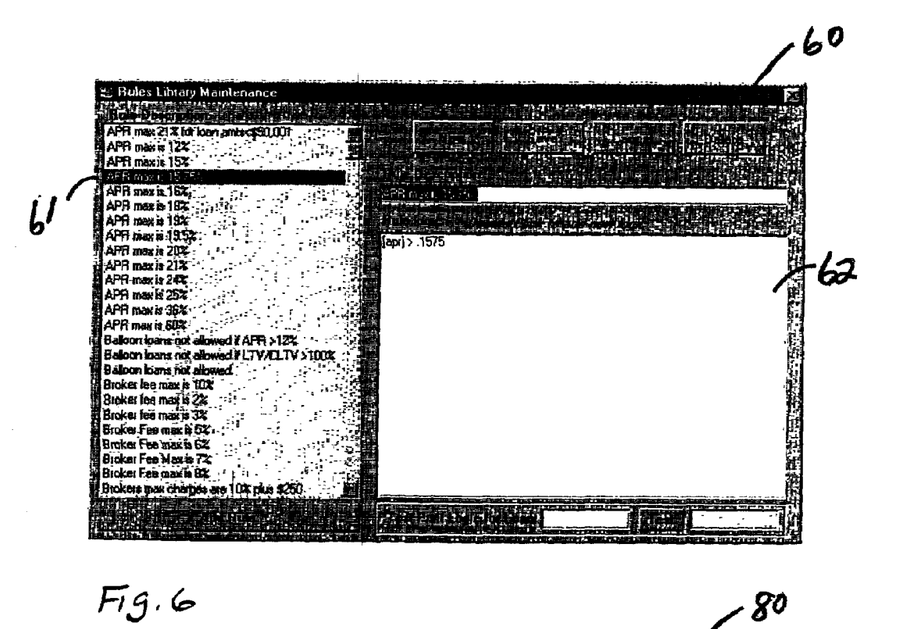
FIG. 6 is a display of the loan compliance library.

FIG. 2 is a system architecture diagram of the loan compliance rules and data 13 showing the communication with a user interface 21 and the loan audit engine 12. Compliance base rule variables 22 are the elements that the loan compliance rules and data 13 are constructed from. The compliance base rule variables 22 represent data elements in a loan file. Items such as prepaid interest or the sum of broker fees can be represented and stored as compliance base rule variables 22. Rule building instructions and data 20 allow a user to build compliance rules using the base rule variables 22 and assembling them in math-like equations using operands (such as $+$, $-$, $/$, $*$, $>$, $<$, $<=$, $>=$, ln) to represent a State or Federal requirement or restriction. A user interface 21, such as the rule building user interfaces shown in FIG. 7 and FIG. 8 allows a user to select the base variables and operands to assemble the desired rule and to store them in the rule library. The user interface 21 manages the rule building instructions 20 that control the rule building process to eliminate rule errors due to user math equation construction or operator errors. The compliance rules data library 23 is the stored database of compliance rules that have been built. Rules need only be built once and then stored in the compliance rules data library 23. The stored rules can then be accessed by the user through a user interface 21 and displayed or used to reference or build other license rules. The compliance rules library user interface and data is shown in FIG. 6.

After a rule is built, it is saved in the compliance rules data library 23. The rules in the compliance rules data library 23 are unassigned, that is, they are not associated with a specific loan or license. A reference to the rule is established through the assignment process as provided by the user interface 51 in FIG. 5. The government licenses for originators and lenders 25 are the licenses and rules for the federal, state and other government entities. For each license, rules must be selected and assigned from the compliance rules library 23. When assigned to a license, the rules become assigned compliance rules 24 and are now associated with that license. The specific data application rules 42 for a loan are additional rules that specify whether a compliance rule is applicable to a particular loan. For example, some rules may only apply to first mortgages. The rules may entered by the user via the user interface 21 or may be entered via other means, such as accessing and downloading stored rules through a network interface, such as the Internet, or accessing rules stored on magnetic media, such as CD-ROM, diskettes and the like.

Figure 3:
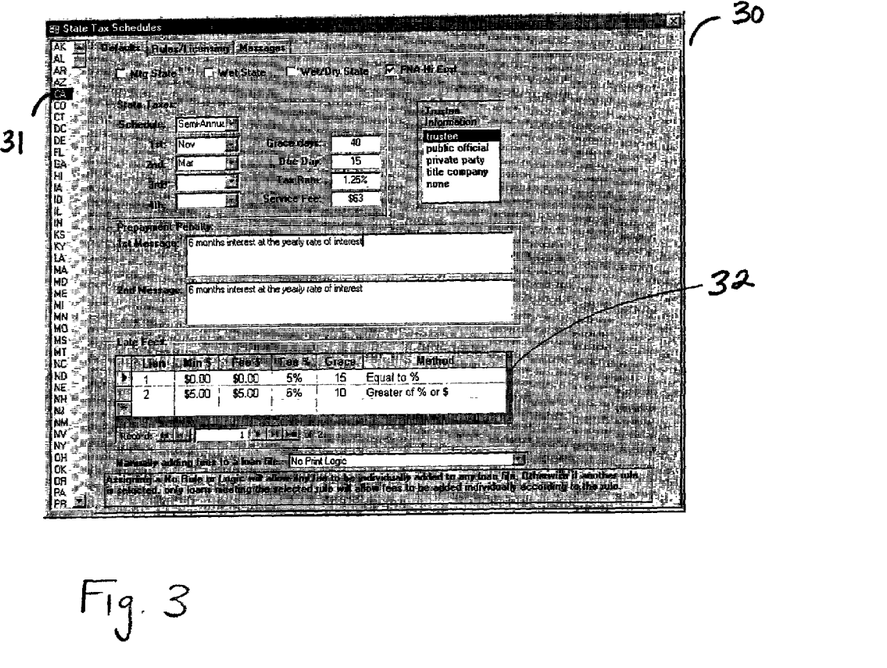
FIGS. 3, 4, and 5 are exemplary displays of the user interface screens for entering and displaying government rules and licenses for loans.

FIG. 3 is an exemplary display of the user interface screen for entering state specific loan compliance rules and data 30. The user selects the particular state where the loan is to be originated 31. The existing defaults for the loan are then displayed to the user. If there are no defaults, the user may enter the data using the user interface 30. For example, as shown in FIG. 3, the late fees that are allowed in the particular state are displayed for lien 1 (a first mortgage) and lien 2 (a second mortgage) 32. The user may have entered this data or the display may be the defaults previously entered into the system.

Figure 4:
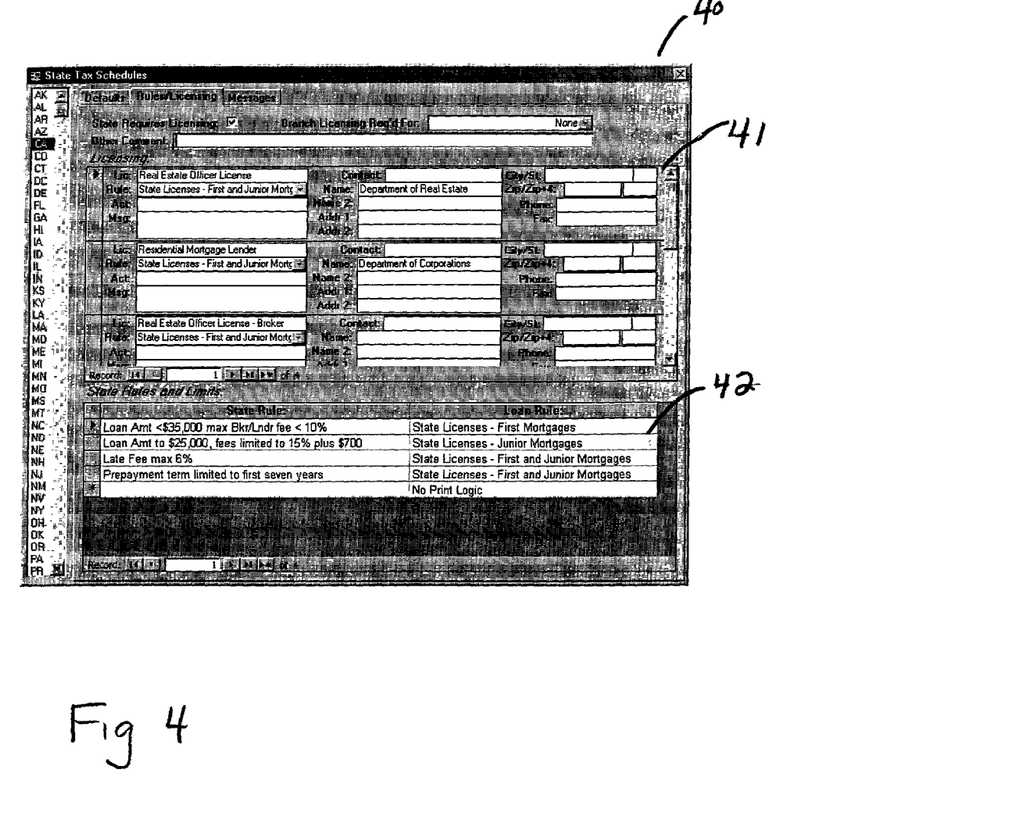
Figure 5:
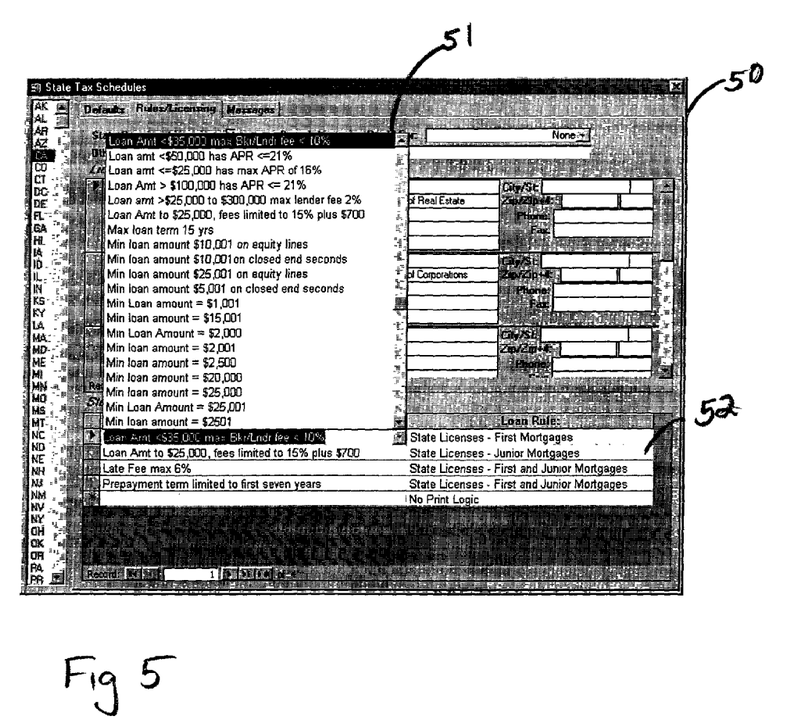
Figure 7:
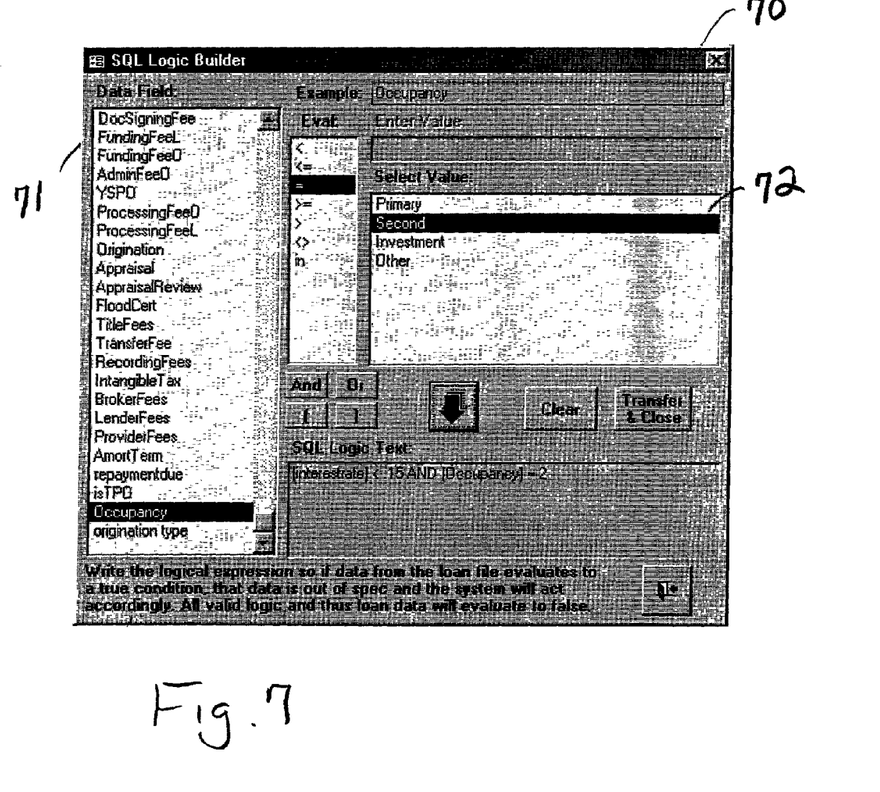
FIG. 7 is a display of the rule building instructions for the compliance rules.

FIGS. 4 and 5 are exemplary displays of the user interface screens for entering and displaying government rules and licenses. FIG. 4 shows the display where all state licenses are entered and maintained 40. Each state may allow one or many difference licenses. The licenses allow originators and/or lenders to originate or close loans on properties within the state. The licensing portion 41 of the display and user interface allows for the entry of the specific data regarding the state authority governing the loan. In the example shown, the Department of Real Estate governs the real estate office license, in this case in the state of California. The state rules and limits portion of the display 42 allows for the appropriate rules that are related to the specific license to be entered, revised or displayed 41. The license requirements are defined as a rule using the rule building tools and then the rules are selected from a list and used wherever they apply. FIG. 5 shows the compliance rules library user interface 50. Lists of the available rules from the rules library that can be selected from in order to add a rule to a specific license are shown. Selecting a rule 51 causes the its details to be displayed below 52. FIG. 6 shows the user interface screen for modifying the rules description 60. This is the rule object that is displaying the library of compliance rules that have been built and stored and are available for assignment. Selecting a rule description 61 causes the detailed rule equation to be displayed on the screen 62. FIG. 7 shows the user interface for creating or changing a rule equation 70. The user selects the rule 71 and then enters the rule logic to be applied to the rule 72.

Figure 8:
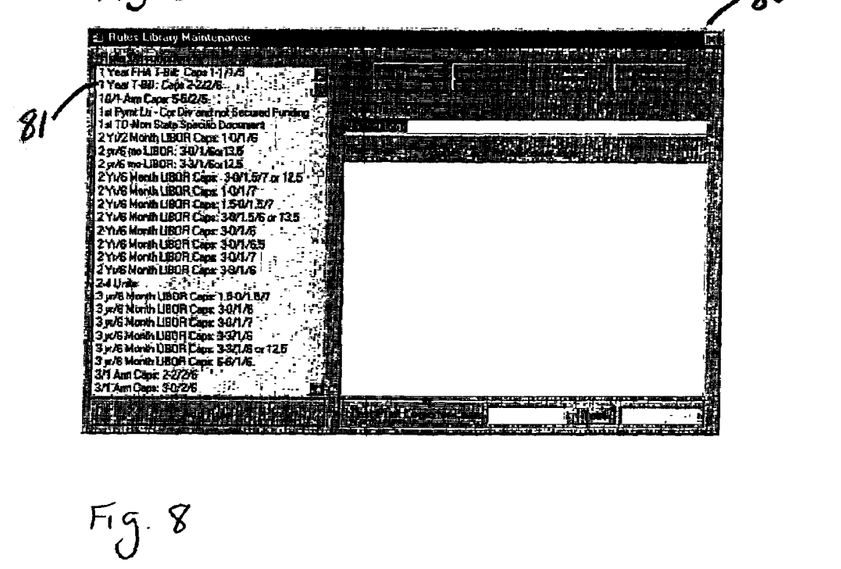
FIG. 8 is an exemplary display of the user interface screen for displaying all the specific loan rules from the loan rule library that may be applicable for a given license.

FIG. 8 is an exemplary display of the user interface screen for displaying all the loan rules that may be applicable for a given license 80. The loan rules are used to effect the application of the compliance rules. The loan rules displayed 81 represent the current list available for a selected license. For instance, a rule may only be applicable for a first mortgage and a different rule may be applicable for a second mortgage.

Figure 9:
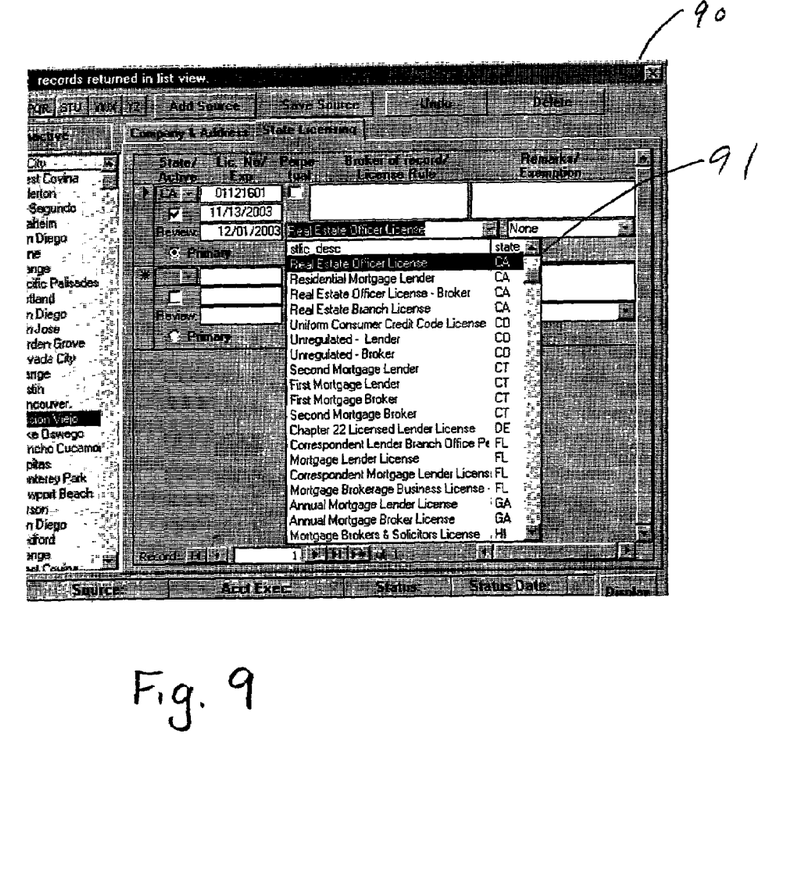
FIG. 9 is an exemplary display of the user interface for assigning government licenses for loan originators and lenders.

FIG. 9 is an exemplary display of the user interface for assigning government licenses for loan originators and lenders 90. The user may assign the license that the entity is using in the state 91. The user may enter in any exemptions, for example, if there is a Federal exemption and a state license is not required or applicable, the user can identify the exemption and its reason. The exemptions may then be stored in the loan compliance rules and data and reused when auditing other similar loans that may have the same applicable exemptions.

Figure 10:
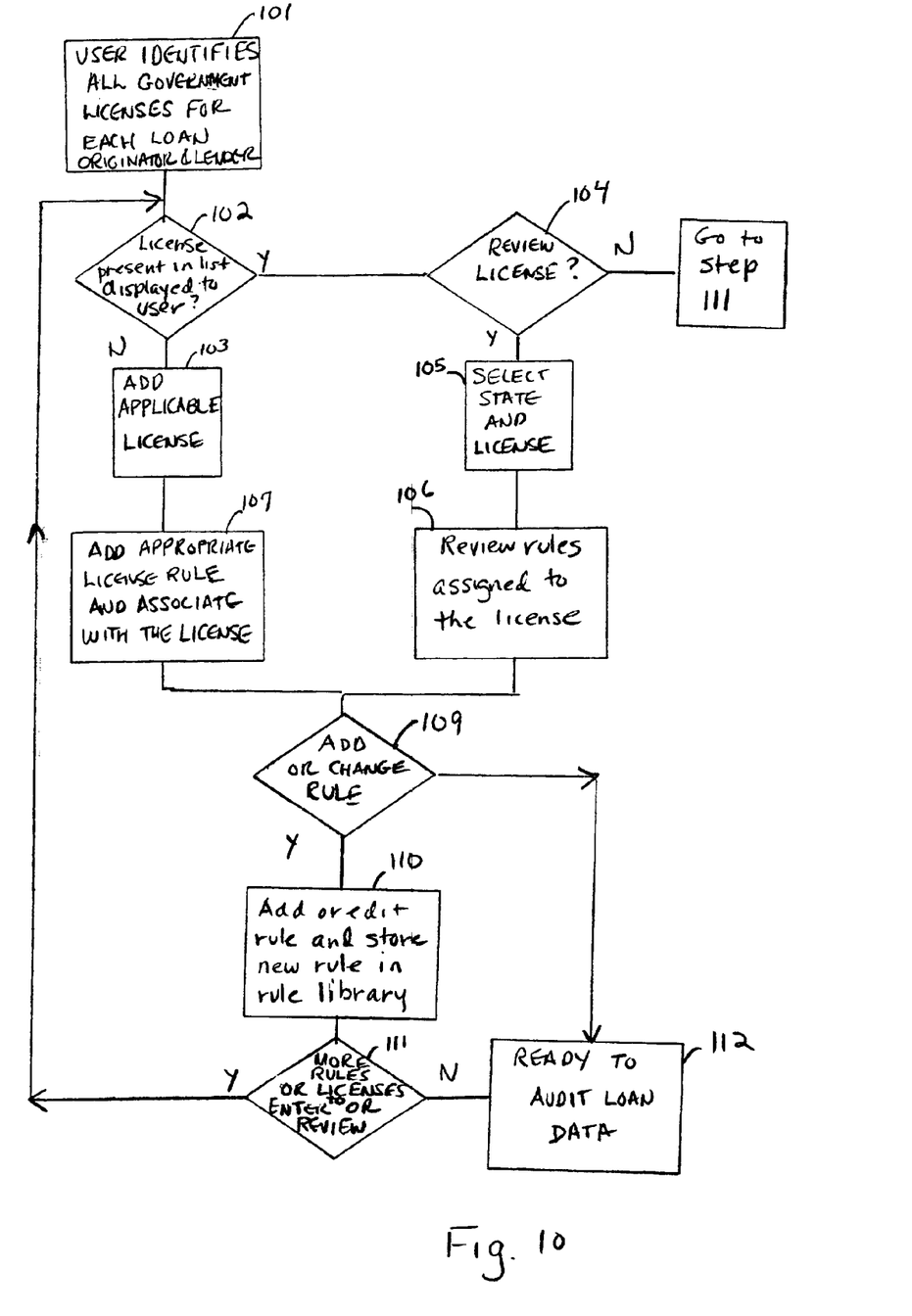
FIG. 10 is a flowchart of the process of building the loan compliance rules and data.

FIG. 10 is a flowchart of the process of building the loan compliance rules and data. The user identifies all government licenses (including Federal, State and any other government entities) and exemptions for each loan originator and lender 101. This can be done by the user using a display similar to that shown in FIG. 4. If the applicable license is not present in the list displayed to the user 102, then the user adds the appropriate state license 103. The user then adds the appropriate license rule and adds the rule to the license 107. If the license is present in the list displayed to the user 102, and the license needs to be reviewed 104, the user selected the state and license 105. The user then reviews all of the rules assigned to that license from the rule library 106. If a rule is missing, then the user selected the rule library where the user can review all the existing defined rules and can add new rules to the library 108 as shown in FIGS. 6 and 8. Using the rule builder 109 (as shown in FIG. 7), the user builds a new rule or changes an existing rule. The rule is stored in the rule library 110 and is available for assignment to a license. If there are more rules or licenses to enter or review 111, processing continues at step 102. If there are no more rules or licenses to enter or review 11, the rules are now ready to be used to audit the loan data.

Figure 11:
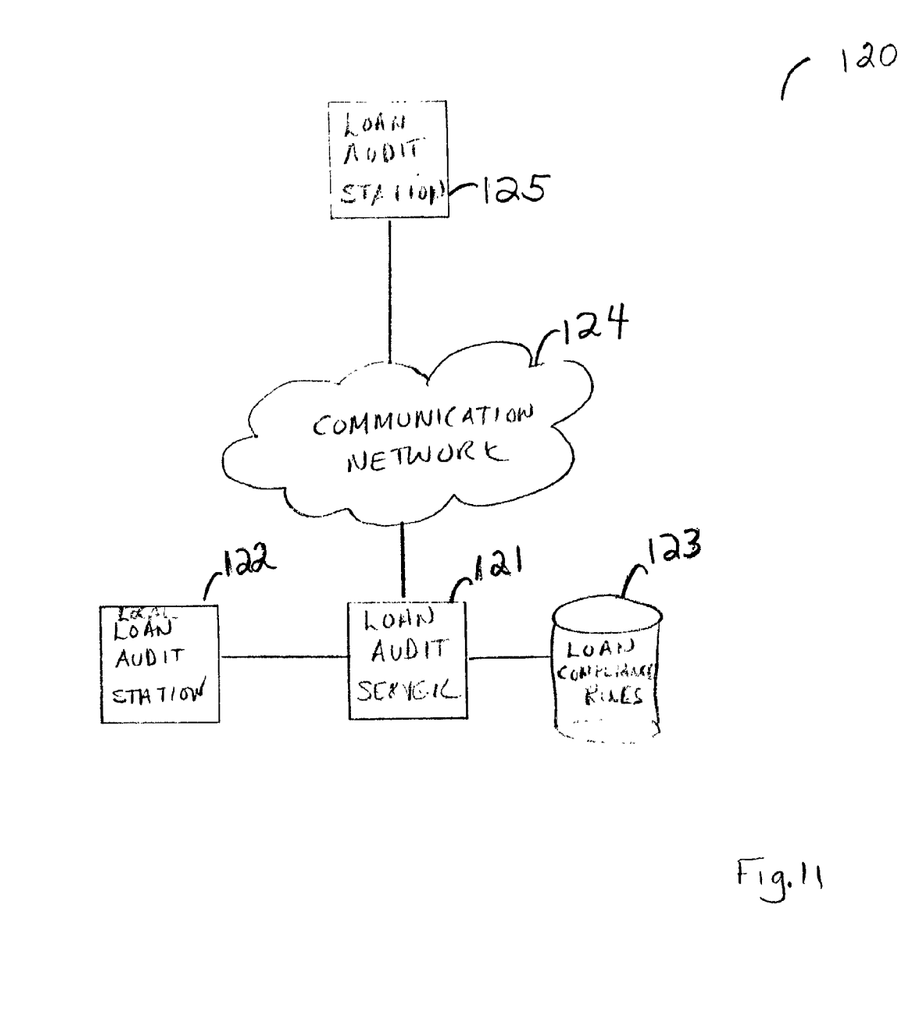
FIG. 11 shows a block diagram of a loan compliance auditing system.

FIG. 11 shows a block diagram of a loan compliance auditing system 120. The loan compliance audit system 120 includes a loan audit server 121, at least one loan audit station 122 and 125, a loan compliance rules database 123 and a communication network 124.

The loan audit server 121 comprises a device or set of devices couple to the network 124, such as a general purpose processor operating under control of an operating system and application software disposed to respond to messages from the loan audit stations 122 and 125. In different embodiments, the server can comprise a UNIX® or Microsoft NT® server. The loan audit server 121 can communicate with a database of loan compliance rules 123. The loan audit server 121 may also contain the loan audit engine (FIG. 1, 12) software program modules and the rule interpreter and calculation engine (FIG. 1, 14) software program modules. The loan audit server may be a web server. In another embodiment, the loan audit server 121 can communicate with other processors or servers hosting the loan audit engine and the rule interpreter and calculation engine software program modules. Each module can be executed as a separate logical server or using a separate physical device.

The loan audit stations 122 and 125 comprise a device or set of devices such as a general purpose processor operating under the control of an operations system and application software and containing a user interface display for entering data and viewing loan audit results. In one embodiment, the loan audit station can comprise a personal computer and the like or can comprise software operating a processor used for the loan audit server 121.

For the loan audit stations 122 and 125, the loan audit server 121 operates as a single logical server available either through the communication network 124 or through a direct interface to the loan audit station 122. The communication network 124 provides for communication between the loan audit server 121 and the loan audit station 125. The network my be a wide area network (WAN), local area network (LAN), intranet, global communications network such as the internet, wireless network or other type of communication connection to link the loan audit station 125 to the loan audit server 121.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A computer-implemented method for auditing loan compliance with government loan lending and licensing requirements, comprising the computer-implemented steps of:
   a. allowing a user to display, enter and edit loan audit compliance data comprising compliance base rule data elements capable of being entered into mathematical equations, and storing the loan audit data in a loan data database in a computer system;
   b. allowing a user to interactively build loan compliance rules comprising mathematical equations using compliance base rule variables and algebraic operands that are derived from and represent said government loan lending and licensing requirements, and storing the loan compliance rules in a loan compliance rules database in the computer system;
   c. responding to a loan audit request including:
      i. retrieving the loan compliance rules from the loan compliance rules database;
      ii. retrieving the loan audit data from the loan data database;
      iii. applying the loan compliance rules to the loan audit data by inserting the compliance base rule data elements from the loan audit data into the compliance base rule variables of the compliance rules for determining a loan audit compliance result; and
   d. notifying said user of the determined loan audit compliance result.

2. A computer-implemented method for auditing loan compliance with government loan lending and licensing requirements, comprising the computer-implemented steps of:
   a. allowing a user to display, enter and edit loan audit compliance data including compliance base rule data elements capable of being entered into mathematical equations, comprising the steps of:
      i. receiving and displaying loan audit data on a user interface of a computer system; and
      ii. storing the loan audit data in a loan data database in the computer system;
   b. allowing said user to interactively build loan compliance rules including mathematical equations using compliance base rule variables and algebraic operands that are derived from and represent said government loan lending and licensing requirements on said user interface of the computer system, comprising the steps of:
- i. using applicable licenses for a geographic boundary, building loan compliance rules for all applicable licenses available within the geographic boundary and storing the loan compliance rules in a loan compliance rules database in the computer system; and
- ii. associating licenses from the applicable licenses with a loan originator to form a set of loan originator applicable licenses and storing the list of loan originator licenses in the loan compliance rules database in the computer system;

c. responding to a loan audit request received from said user on a user interface of the computer system, comprising the steps of:
- i. identifying a loan type and loan originator;
- ii. retrieving the loan originator licenses for the loan type and loan originator from the loan compliance rules database;
- iii. retrieving the loan compliance rules associated with the loan originator licenses from the loan compliance rules database;
- iv. retrieving the loan audit data from the loan data database;
- v. applying the loan compliance rules to the loan audit data by inserting the compliance base rule data elements from the loan audit data into the compliance base rule variables of the compliance rules for determining a loan audit compliance result; and d. notifying said user of the determined loan audit compliance result.

3. The method of claim 2 further comprising building rules for all applicable licenses available within the geographic boundary using compliance base rule variables and rule building instructions and storing the loan compliance rules in a rule library database in the computer system.

4. The method of claim 3 wherein building rules for all licenses available within the geographic boundary using the compliance base rule variables and rule building instructions further comprises:

allowing the user to add a new license to the applicable licenses available; and allowing said user to build new rules for the new license.

5. The method of claim 2 further comprising storing the loan compliance rules in said rule library database in the computer system.

6. The method of claim 5 further comprising, if a rule exists in the rule library database for a license, allowing the user to review the rule.

7. The method of claim 5 further comprising, if a rule exists in the rule library database for a license, allowing the user to change the rule.

8. The method of claim 5 further comprising allowing the user to modify the loan compliance rules in the rule library database.

9. The method of claim 3 wherein the compliance base rule variables represent data elements in a loan file in the loan data database.

10. The method of claim 3 wherein said rule building instructions comprise allowing the user to build rules by specifying equations using base rule variables.

11. The method of claim 10 wherein the rule building instructions comprise controlling the rule building process to eliminate rule errors.

12. The method of claim 2 further comprising associating the loan compliance rules with a license to form a set of assigned compliance rules.

13. The method of claim 2 wherein the geographic boundary is a state.

14. The method of claim 5 wherein the user displays and enters loan data using said user interface embodied in a computer processor that communicates with the rule library database via a communications network.

15. The method of claim 14 wherein the communications network is a global communications network.

16. The method of claim 12 further comprising allowing said user to identify and store applicable exemptions to the government license requirements in the assigned compliance rules.

17. The method of claim 13 wherein the government loan originator requirements are state loan requirements.

18. The method of claim 13 wherein the government loan originator requirements are federal loan requirements.

19. The method of claim 13 wherein the licensing requirements are state licensing requirements.

20. The method of claim 13 wherein the licensing requirements are federal licensing requirements.

21. The method of claim 14 wherein the communications network is selected from the group consisting of a satellite communication network, a telephone communication network, a microwave transmission network, a radio communication network and a wireless telephone communication network.

22. A computer implemented method for auditing loan compliance with government and loan lending requirements, comprising the computer-implemented steps of:

a. electronically transferring loan data including compliance base rule data elements capable of being entered into mathematical equations from a user interface embodied in a computer processor to a loan audit server computer over a communications network;

b. at a user interface computer, allowing a user to interactively build loan compliance rules using compliance based rule variables and rule building instructions including mathematical equations using compliance base rule variables and algebraic operands that are derived from and represent the government loan lending and licensing requirements, comprising:
- i. using licenses applicable to a state, building rules for all applicable licenses available within the state; and
- ii. associating the applicable licenses with a loan originator to form a list of loan originator applicable licenses and storing the loan originator applicable licenses;

c. storing the loan compliance rules in a database connected to the loan audit server computer;

d. in response to a loan audit request:
- i. identifying a loan type and the loan originator;
- ii. retrieving the loan audit data and the applicable licenses for the loan type and the loan originator by the loan server;
- iii. retrieving the loan compliance rules associated with the applicable licenses from the stored rules in the database by the loan server;
- iv. applying the loan compliance rules to loan data by inserting the compliance base rule data elements from the loan audit data and the applicable licenses into the compliance base rule variables of the compliance rules for determining loan audit compliance results by the loan server; and e. electronically transferring the loan audit compliance results from the loan server to the user over a communications network.

23. A software program embodied on a computer-readable medium to be executed by a processor or a computer incorporating the method as recited in claim 2.

24. A software program embodied on a computer-readable medium to be executed by a processor or a computer incorporating the method as recited in claim 22.

25. A system for auditing loan compliance with government and loan lending requirements, comprising:
 a. a user interface for displaying, entering and editing loan audit compliance data comprising compliance base rule data elements capable of being entered into mathematical equations; and
 b. a loan audit server communicating with the user interface that:
  i. allows a user to interactively build a set of loan compliance rules using rule-building instructions, the loan compliance rules comprising mathematical equations using compliance base rule variables and algebraic operands that are derived from and represent said government loan lending and licensing requirements;
  ii. stores the loan compliance rules;
  iii. in response to a loan audit request:
   (i) identifies a loan type;
   (ii) determines the loan compliance rules that apply to the loan type;
   (iii) applies the loan compliance rules to loan audit compliance data associated with the loan audit request to determine loan audit results.

26. The system of claim 25 wherein the loan audit results are displayed to the user via the user interface.

27. The system of claim 25 wherein the user interface is embodied in a computer processor that communicates with the loan audit server via a communications network.

28. The system of claim 25 wherein the loan audit server comprises a global communications network ("web") data server capable of transmitting and receiving loan data to and from the user via a global communications network.

29. The system of claim 27 wherein the communications network is the Internet.

30. The system of claim 25 further comprising storing the loan audit results in an audit compliance report.

31. The system of claim 25 wherein the loan compliance rules are built by the user using the user interface.

32. The system of claim 25 wherein interactively building a set of loan compliance rules comprises:
 using applicable licenses for a state, the user builds rules for all licenses available within the state using the compliance base rule variable and rule building instructions and stores the rules in a rule library; and
 using the applicable licenses, the user associates the applicable licenses with a loan originator to form the loan originator applicable licenses.

33. The system of claim 32 wherein in comparing the loan compliance rules with the loan data, the loan audit server:
 identifies a loan type and loan originator;
 retrieves the applicable licenses for the loan type and the loan originator;
 retrieves the loan compliance rules associated with the applicable licenses from the stored rules in the rule library;
 compares the loan compliance rules to the loan data; and
 compiles the loan audit results.

34. The system of claim 27 wherein the communications network comprises a satellite communication network.

35. The system of claim 27 wherein the communications network comprises a telephone communication network.

36. The system of claim 27 wherein the communications network comprises a microwave transmission network.

37. The system of claim 27 wherein the communications network comprises a radio communication network.

38. The system of claim 27 wherein the communications network comprises a wireless telephone communication network.

39. The system of claim 25 further comprising a generating a hardcopy of the loan audit results.

40. The system of claim 25 further comprising storing the loan audit results on media selected from the group consisting of a hardcopy report, a tape, a film and a CD-ROM.

41. The system of claim 25 wherein loan compliance rules comprise:
 compliance based rule variables;
 rule building instructions;
 a compliance rules data library;
 assigned compliance rules;
 a list of government licenses for loan originators; and
 data application rules.

42. The system of claim 25 wherein the user interface communicates with a web browser for transmitting and receiving the loan data and the loan audit results.

43. A computer-implemented method for auditing loan compliance with government loan lending and licensing requirements, comprising the computer-implemented steps of:
 receiving loan application data including compliance base rule data elements capable of being entered into mathematical equations;
 receiving loan compliance rules comprising mathematical equations using compliance base rule variables and algebraic operands that are derived from and represent said government loan lending and licensing requirements;
 applying a selected set of the loan compliance rules to the loan application data by inserting the compliance base rule data elements from the loan application data into the compliance base rule variables of the compliance rules for determining a loan audit compliance result; and
 notifying a user of the determined loan audit compliance result.

44. The computer-implemented method of claim 43, further comprising the computer-implemented steps of:
 receiving rule building instructions and data from said user;
 building the loan compliance rules using the base rule variables assembled into the mathematical equations using algebraic operands that are derived from and represent the government loan lending and licensing requirements; and
 storing the loan compliance rules in a rules library.

45. The computer-implemented method of claim 43, wherein the step of applying a selected set of the loan compliance rules is determined by designating specific data application rules for a particular loan application data file.

46. A software program embodied on a computer-readable medium to be executed by a processor or a computer incorporating the method as recited in claim 43.

* * * * *

UNITED STATES PATENT AND TRADEMARK OFFICE
CERTIFICATE OF CORRECTION

PATENT NO.        : 7,412,417 B1                                         Page 1 of 1
APPLICATION NO.   : 09/518837
DATED             : August 12, 2008
INVENTOR(S)       : Tuttle It is certified that error appears in the above-identified patent and that said Letters Patent is hereby corrected as shown below:

On the Title Page:

item (73)

Change from:   (73) Assignee:   Infoglide Software Corporation
                                Austin, TX (US)

Change to:     (73) Assignee:   Mavent Holdings, Inc.
                                Irvine, CA (US)

Signed and Sealed this

Seventh Day of April, 2009

JOHN DOLL
*Acting Director of the United States Patent and Trademark Office*